US005742763A

United States Patent [19]
Jones

[11] Patent Number: 5,742,763
[45] Date of Patent: Apr. 21, 1998

[54] UNIVERSAL MESSAGE DELIVERY SYSTEM FOR HANDLES IDENTIFYING NETWORK PRESENCES

[75] Inventor: Mark Alan Jones, New Providence, N.J.

[73] Assignee: AT&T Corp., Middletown, N.J.

[21] Appl. No.: 581,141

[22] Filed: Dec. 29, 1995

[51] Int. Cl.⁶ ............................................. G06F 13/00
[52] U.S. Cl. ................ 395/200.3; 395/683; 364/DIG. 1
[58] Field of Search .................. 348/12; 37/389; 395/200.09, 672, 200.01

[56] References Cited

U.S. PATENT DOCUMENTS

| | | | |
|---|---|---|---|
| 5,438,568 | 8/1995 | Weisser, Jr. | 370/389 |
| 5,555,376 | 9/1996 | Theimer et al. | 395/200.09 |
| 5,557,320 | 9/1996 | Krebs | 348/12 |
| 5,608,907 | 3/1997 | Fehskens et al. | 395/672 |
| 5,611,050 | 3/1997 | Theimer et al. | 395/200.09 |

*Primary Examiner*—Tod R. Swann
*Assistant Examiner*—David Langjahr

[57] ABSTRACT

A message delivery system, for use with a communication network and in which a network presence is provided for an entity having attributes, delivers a message from a sender to the network presence. In some cases, information identifying the sender is omitted from the message. The delivery system can append non-repudiable sender information to the message. The sender can provide selected attributes as an address, and the delivery system replaces the selected attributes with an address of the network presence without disclosing the address to the sender. A software agent processes the delivered message in accordance with a processing preference included in the entity attributes.

6 Claims, 2 Drawing Sheets

UNIVERSAL MESSAGE DELIVERY SYSTEM FOR HANDLES IDENTIFYING NETWORK PRESENCES

BACKGROUND OF THE INVENTION

The present invention relates to a computer-based communication network service, and, more particularly, is directed to a system in which entities are represented by network presences associated with handle identifiers used as addresses.

Communication by messaging is becoming steadily more popular. Advantages of messaging relative to a personal conversation include more efficient use of communication capacity, that is, text based electronic mail requires far less channel capacity than an equivalent voice message; more time efficient due to less need for time consuming ritual social inquiries; opportunity for more careful composition; and capability of including various types of communication, that is, the message can be in a multimedia format including audio, video and/or text. Furthermore, if the message is broadcast, its composition effort is amortized across the recipients. Also, the message can be buffered when a recipient is unavailable or unwilling to receive the message immediately; the recipient has more time to plan their response; an electronic message is easy to capture and place in long term storage; and software can be used to assist in composing and organizing messages.

One problem with presently available forms of messaging is that it is necessary to determine and remember addressing information which is substantially unrelated to the identity of the recipient. Voice and facsimile messages require a telephone number. Electronic mail messages require an address usually comprising an assigned user name and electronic domain name, and possibly information indicating a communication service provider. Also, the format of an electronic mail address can differ depending on the communication provider.

Telephone numbers are difficult to remember, usually change when a person moves or switches jobs, can be obtained through a directory having only a very limited number of search fields and may lack privacy as it is fairly easy to associate address information with a telephone number.

Personal telephone numbers, such as the proposed AT&T 500/700 personal number services, assign a telephone number to a subscriber, and associate the assigned telephone number with a destination telephone number and, optionally, a backup telephone number having a voice recording and storage device. Callers call the assigned telephone number, and calls are automatically routed to the destination telephone number. If the destination telephone number does not accept the call, then the call is automatically routed to the backup telephone number. The destination telephone number may be changed frequently by the subscriber. These personal number services mask changes in the subscriber's telephone number, that is, allow a subscriber to have a single telephone number even while travelling or moving frequently, and provide increased privacy. However, the personal numbers are still difficult to remember, can be obtained through a directory having only a very limited number of search fields, are accessible through only one medium, and, due to reliance on a telephone number, are tied into a particular addressing infrastructure which has limited call management options.

Electronic mail addresses are often difficult to remember, usually change when a person switches jobs or communication carriers, and are difficult to obtain due to lack of universal directory services.

Another problem with presently available forms of messaging is that if someone is reachable by a variety of message types, e.g., voice mail, facsimile and electronic mail on several networks, a sender is not sure which type of message will be most effective at reaching the intended recipient.

A further problem with presently available forms of messaging is that there may be a conversion problem between an available sending device, such as a twelve-key telephone, and a preferred receiving device, such as a facsimile machine. Also, there may be a conversion problem between the form of the originating message, e.g., voice mail, and the preferred form of received message, e.g., electronic mail. Products for converting the form of the message, such as the AT&T INTUITY product for a PBX/LAN environment, have been introduced, but have not yet achieved widespread usage. A proposed Multipurpose Internet Multimedia Extension (MIME) specification for Internet electronic mail allows senders to provide content in multiple, alternative formats but conversion issues have not been resolved.

SUMMARY OF THE INVENTION

A message delivery system, for use with a communication network and in which a network presence is provided for an entity having attributes, delivers a message from a sender to the network presence.

In an aspect of the invention, information identifying the sender is omitted from the message. In another aspect of the invention, the delivery system appends non-repudiable sender information to the message.

When the sender provides selected attributes as an address, the delivery system replaces the selected attributes with an address of the network presence without disclosing the address to the sender. In another aspect of the invention, a software agent processes the delivered message in accordance with a processing preference included in the entity attributes.

It is not intended that the invention be summarized here in its entirety. Rather, further features, aspects and advantages of the invention are set forth in or are apparent from the following description and drawings.

DETAILED DESCRIPTION OF THE PREFERRED EMBODIMENTS

An entity is represented by at least one handle, described in detail below. Generally, a handle is a more abstract representation of the entity than is found in the prior art, and avoids the problems of prior art entity representations associated with their insufficiently abstract (i.e., too physical) nature. Each handle provides a distinct cyberpresence identifier for an entity.

Directory services, as described in the present disclosure, provide more flexibility than prior art directory services. When used with handles according to the present disclosure, directory services provide further enhanced flexibility. Generally, a network directory service provides information about entities and finds entities based on descriptive queries. Some of the directory information is publicly available, whereas other of the directory information is not publicly available but is usable by the directory service for dereferencing addresses. Entities specify the desired privacy level (s) of their directory information. The service provides one or more global and specialized network directories, which may be physically distributed across multiple hosts in the network.

Message composition and delivery services, as described in the present disclosure, provide more flexibility than prior art message composition and delivery services. When used with handles according to the present disclosure, message composition and delivery services provide further enhanced flexibility. Generally, message delivery services provide for specification of policies by entities as to the forwarding of messages to specific endpoints or to a universal message storage facility, notification of message receipt and retrieval of messages. Message notification and retrieval may be according to entity specified criteria, such as priority to particular senders or to particular subjects.

Message storage services, as described in the present disclosure, provide more flexibility than prior art message storage services. When used with handles according to the present disclosure, message storage services provide further enhanced flexibility.

An important feature of the present disclosure is the application to objects such as messages and cyberpresences of information retrieval techniques, such as vector space models, which have heretofore been applied only to documents. Generally, flexibility is accomplished by applying information retrieval techniques to objects, rather than by relying primarily on more structured database query techniques.

Network Environment

Figure 1:
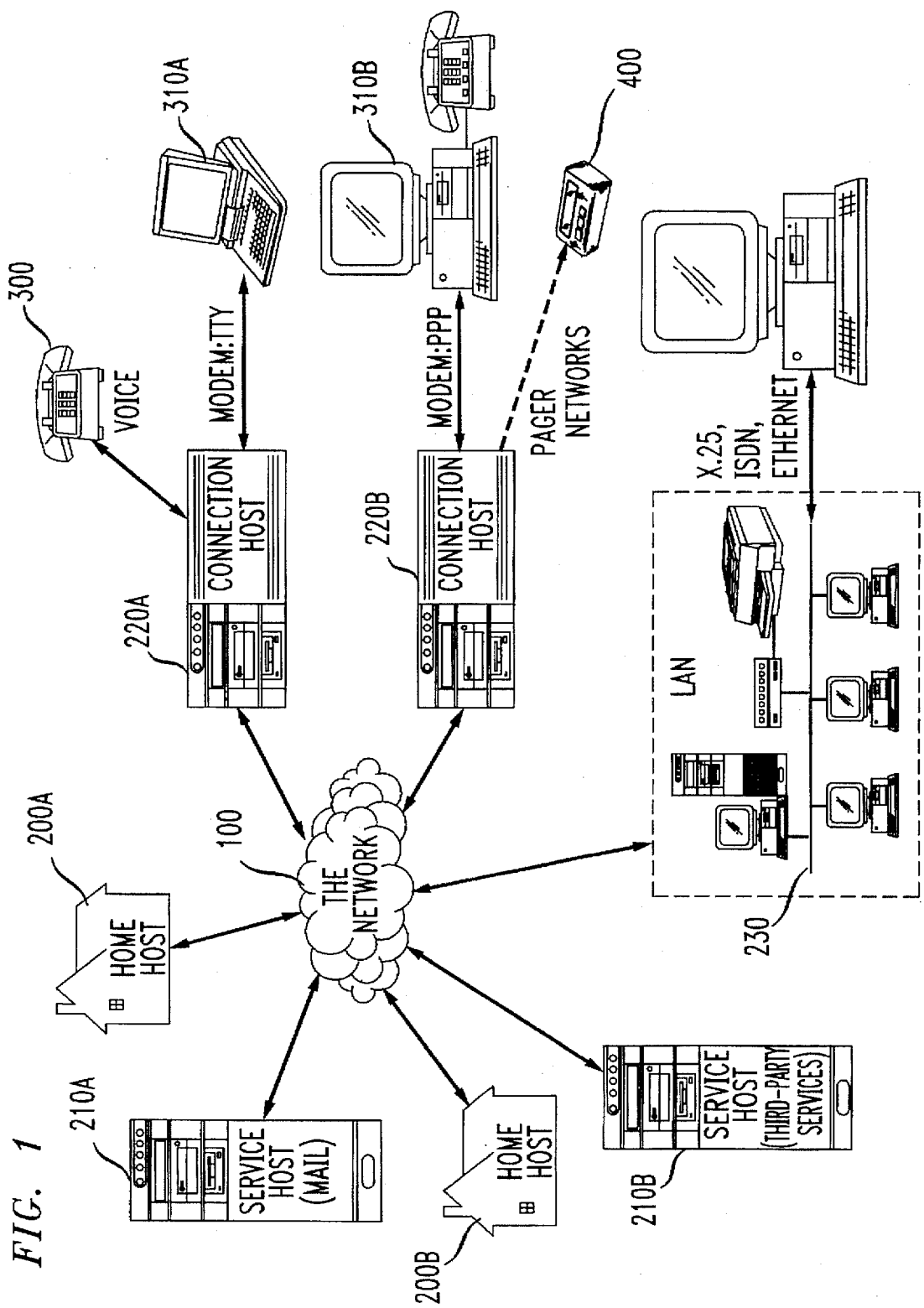
FIG. 1 is a block diagram of a communications network according to the present invention.

Referring now to the drawings, and in particular to FIG. 1, there is illustrated a network which is generally assumed as the environment in the present disclosure. The network shown in FIG. 1 comprises a communication network 100, home host computers 200, service host computers 210, connection host computers 220, gateways to other networks such as a local area network (LAN) 230, software executed on the various computers, and customer premises equipment such as twelve-key telephone sets 300, personal computers 310, terminals, and pager networks 400. Although not specifically shown in FIG. 1, internet connections and wireless transmission may be used in a network contemplated in the present disclosure.

As will be apparent to those of ordinary skill in the art, many different communication protocols may be employed in communicating between the various parts of the network, such as TCP/IP, X.25, ISDN, Ethernet, asynchronous line protocols and analog and/or digital voice transmission. Communication for transactional services are implemented in a secure, flexible remote procedure call (RPC). Also, as appropriate, authentication and encryption protocols are employed, for example, hypertext transfer protocol (HTTP) or secure socket layer (SSL) protocol.

Various divisions of communications capability between customer equipment and network equipment are encompassed by the network of FIG. 1. The network is assumed to provide processing capability for customer equipment which lacks sufficient processing capability to provide the functions described below. The specific type of software programming used to provide these functions is not critical.

In one case, the customer equipment comprises only a twelve-button telephone set. A user dials a connection host which is part of the network, such as the nearest connection host or a toll-free number providing access to a connection host. Using one or more of voice input and touch-tone input, the user establishes network access authority, such as by entering an identification code and password. The connection host verifies access authority with the user's home host, then makes appropriate network resources available to the user by, for example, presenting menus of choices to the user.

In another case, the customer equipment comprises a private host such as a personal computer and a modem. The user instructs the private host to establish a connection to a connection host. In this case, the connection host functions in a more limited manner than in the previously described situation where the customer premises equipment is a telephone set.

In yet another case, the customer equipment comprises a receive only pager network. A connection host somewhere in the network executes software on behalf of the pager network.

Handles

An entity may be a person, organization, corporation, department within a corporation, use (interest) group, or a set of entities. Alternatively, the entity may be a functional role, such as president of an organization.

An electronic presence is established for every entity which requires a public identity. The electronic presence is also referred to herein as a network presence or "cyberpresence". The electronic presence is identified by a handle. The network presence for an entity serves as a locus of publicly available information about the entity, as a point of connection to the entity, and as a centralized set of resources available to the entity. Physically, a network presence comprises an account on a home host computer, such as the home host computer shown in FIG. 1, the actual network resource usage associated with the account, the capability of using additional network resources and identification of the account in network directories. Typically, an account resides on a home host, but some accounts may reside on multiple hosts due to their resource usage.

An entity may have multiple network presences each of which is associated with a distinct handle. For example, an entity which is a person may have one network presence for activities related to their job, another network presence for activities related to their primary hobby, and yet another network presence for activities related to their other personal uses.

As used herein and in the claims, "handle" refers to a unique identifier registered with a universal directory network service for use by the entity. A handle represents an abstract entity, and does not correspond to a physical endpoint although it may be associated with one or more physical endpoints for various purposes, as described below. The handle functions as the network name of the entity, and also functions as the network address of the entity, but is not a physical end point address. An entity may have one or more handles each of which is associated with a network presence. Primarily for billing purposes, each handle is associated with a sponsor that is not necessarily the entity using the handle.

Handles permit decoupling of physical endpoints and delivery systems from the network presence for an entity. That is, a handle is not merely an address, it is a representation of an entity because it is associated with resource usage and availability for the entity.

Since a handle is unique at any point in time, it can be used as a universal address. Another important feature of a handle is its persistence, that is, its association with one using entity despite changes in the attributes associated with the entity, such as telephone number, address, employment affiliation or sponsor. If the entity is a group, then members or other attributes of the group may change over time, but the group (entity) still retains the handle. Similarly, if the entity is a person performing certain functions, e.g., the president of XYZ Company, then the person associated with the handle may change, but the handle persists; in this case, the handle is a referential expression describing a functional role.

Examples of handles are: "bigbear", "Jane_Farnsworth", "ATT", "usenet.rec.gardening", "empiricists", "president_XYZ" and so on. A handle is not a telephone number. A telephone number is a physical point which is associated with a varying number of users, whereas a handle is not a physical point, and is associated with only the entity represented by the handle. A handle may include alphabetic information which serves a mnemonic purpose.

Advantages of personally chosen handles, relative to handles assigned by a network authority, include memorability, that is, personally chosen handles have mnemonic value for message senders, individuality, ability to be descriptive or representative of a network persona or attributes of an entity, and ability to mask the identity of an entity.

Handles may eventually be reassigned, when the possibility of confusion between entities is deemed to be sufficiently low. For example, when an entity expires, such as a person dies or a corporation is dissolved, and a predetermined time has passed since expiration, the handle of the expired entity may become available for use by another entity.

Examples of entity attributes which may be associated with an individual's handle include password(s), name, address, preferred format for message reception, primary telephone number, forwarding telephone number, fax number, family members, employer, profession, hobbies and so on.

Examples of entity attributes which may be associated with an organization's handle include password(s), name, address, preferred format for message reception, telephone number, fax number, number of members, industry, products or services, annual sales, affiliated companies and so on.

As the name of a network presence for an entity, a handle is a logical place for an entity to obtain and/or offer network services. Generally, the network resources available to an entity include a personalized access point, information storage capacity, information access structures such as an "address book", a personalized set of message spaces, and convenient ways to access frequently used on-line services.

An "address book", as used herein and in the claims, is a personalized directory of frequently accessed message destinations for the entity, that is, a set of handles which identify entities. In other words, the objects in an address book are handles. An address book allows the entity to refer to other entities in a more convenient manner, such as by name, photograph, or nickname; thus, the address book hides the actual handles from the entity.

Since the attributes associated with a handle may change over time, it is preferred to locally store only the handles for an address book with respective temporal information such as date/time stamps. At each use of a handle, the address book automatically queries the directory service as to whether any attributes have changed since the timestamp of the handle. The address book locally stores any local information associated with the handle, such as the entity's nickname or relationship definition for the handle. The initial contents of the address book may be determined with reference to the sponsor of the entity.

A query can define a "special" address book of an entity's base (universal) address book, that is, the query restricts the set of handles in the special address book.

The entity can view a subset of the address book by specifying attributes of the objects in the desired subset. For example, a view of an address book may provide, for each entity, its name, face (or other) picture and telephone number.

An entity obtains services through its handle generally by subscribing to the service; such services are referred to herein and in the claims as "vendor services". Service providers, which may be third party vendors, the provider of the communication network or the provider of the network presence system, then add the service capabilities to the handle in an appropriate manner, such as by authorization to act on instructions from the handle, by adding choices to menu-driven interfaces accessible to the handle, or by adding functional capabilities to software agents associated with the handle. Examples of software agents are a message handling agent and a message storage agent, described below. Examples of vendor services are a message composition service, a calendar scheduling service and a software agent service. FIG. 1 shows a service host for third-party services in which the vendor offers a service directly from its own handle and other handles must explicitly communicate with the vendor's handle for the service.

An entity offers services through its handle by responding to requests directed to the handle. For example, the entity may add functional capabilities to one of the agents associated with its handle to provide a service to other handles. In some embodiments, for provision of certain services, the entity may make special billing arrangements with the network.

When the entity is accessible to at least one messaging service, the attributes of an entity include a physical endpoint to which messages are to be delivered. For example, when the entity is a pager network, the physical endpoint is the pager equipment. When the entity is an individual, the physical endpoint can be non-network equipment, such as a fax machine, or network storage.

When the entity is accessible to at least one messaging service, the attributes of an entity include a preferred media format for receiving messages. For example, when the entity is accessible by more than one message media format, such as fax, voice mail, textual electronic mail and multimedia electronic mail, the entity indicates the media format in which it prefers to receive messages in its "preferred reception media" attribute.

There are several differences between personal telephone numbers, such as the proposed AT&T 500/700 personal number services, and the handles of the present invention. The personal number services provide a customer with only a telephone number, that is, a completely numeric identifier which lacks mnemonic value, whereas the present handles may comprise alphanumeric information having mnemonic value. The personal number services must be associated with at least one destination telephone number for a customer, whereas the present handles need not be associated with a specific telephone number, instead, an entity may opt to have the network store its messages, and then the entity retrieves its messages from the network, for example, by a dial-in telephone call.

Directory Services

The universal network directory service stores attributes associated with handles and responds to queries relating to the stored information to provide a very flexible searching ability. The directory service may be a vendor service.

When a directory user such as a message sender desires to know a handle for an entity, the sender provides sufficient descriptive information to uniquely identify the entity. In some cases, the sender interacts repeatedly with the directory service to uniquely identify the entity. For example, in response to the sender's provision of a person's name, city and state of residence, employer and profession, the directory service returns the requested handle.

In other situations, a directory user knows a handle and provides a query to the directory service to obtain one or more attributes associated with the handle. For example, a directory user may wish to know a daytime telephone number associated with a handle.

Handle attributes have privacy level information specified by the entity represented by the handle. In its simplest form, privacy level information simply indicates whether the attribute is publicly available or not publicly available, i.e, private. Therefore, entities may maintain essentially "unlisted" handles with no attribute information publicly available.

The directory service generally maintains indices of the attributes in a variety of hierarchical structures, and responds to structure sensitive queries.

Each of a directory query and a response thereto generated by the universal network directory service may contain multimedia depending on the kinds of interfaces and applications used. As used herein and in the claims, information in a multimedia format means information in at least two of an internal computer format such as binary format, text format such as ASCII, voice format and video format.

Entities and/or their respective sponsors have the ability to self-administer certain of the entity's attributes in accordance with preferences, such as password(s), preferred format for message reception, forwarding telephone number and privacy status of their attributes, using an automated administration procedure including a software program executed on at least one of the hosts of FIG. 1.

Handle attributes have authenticity information associated therewith. In its simplest form, authenticity information simply indicates who provided the attribute information. More complicated authenticity information indicates, for example, when the attribute information was provided. The authenticity information provides a basis for forming a trustworthiness opinion of the associated attribute information.

When the user of the directory service is a handle, additional flexibility is contemplated. Specifically, the information returned from the directory service may be automatically transferred to another service, such as a message composition service offered by a third-party vendor. For example, when a handle queries the directory service for all handles having specified attributes, such as:

(type of entity=individual), (family members=at least one child), and (address=NY or NJ)

the resulting set of handles may be used as a set of addresses for a message broadcast by a message preparation service used by the handle.

In certain embodiments, an additional privacy designation of "secret" is available for information associated with a handle. This is useful for broadcasts prepared by a message preparation service to entities matching specified criteria, where the matching entities wish to remain unknown, for example, persons testing positive for a particular disease. In these cases, the entities may be interested in receiving information related to their attributes, but want their possession of such attributes to be masked from mass marketers and/or probes attempting to guess the information. If secret information is used to resolve a handle, then information identifying the receiving entity is withheld in any delivery receipts provided by the network to the sender or querying party.

Another example of additional flexibility when the user of the directory service is a handle is an updating service for an address book. The updating service may simply add the results of each directory query to the address book. Alternatively, the results of the directory query may automatically be transferred to the updating service, and then the updating service asks the entity associated with the handle using the directory whether and/or how to retain the results. As yet another alternative, a software agent associated with the handle may treat the results of the directory query as an information object to be processed in accordance with general policies specified by the entity for information objects, i.e., policies for information which is not limited to directory information.

Message Composition and Delivery Services

A message composition service permits a message to be composed and associated with a destination query. That is, a message is sent to a destination query, rather than a specified endpoint. The destination query is of the form described earlier for the directory service.

A message delivery service provides delivery of the message to the objects satisfying the destination query associated with the message, with the objects typically being handles.

Messages are assumed to include content information and envelope information, such as sender, destination query determining the recipient(s), network transit history, arrival time, subject and priority. Senders are identified by their handles. Recipients are identified by the destination query, unless their identity is masked (see discussion below). Content information may comprise multimedia and interactive programs; notes from family, friends and business associates; electronic correspondence from businesses, government, associations and so on; electronic postcards; electronic letters; electronic newsletters and magazines; electronic advertising; electronic solicitations and so on.

When the sender knows the preferred media format for the recipient of the message, the sender can instruct the message delivery service to put the message, composed in one format, into the preferred format when technically feasible. For example, the message may be composed as text, and converted to voice using speech synthesis. As will be appreciated, the preferred media format for a message recipient can usually be determined from a query to the network directory service. Certain message preparation services are capable of automatically querying the directory service and using the query results for format conversion.

The message sender can require that it remain anonymous, for example, by composing a message with the sender explicitly identified as "anonymous" or by omitting sender information.

A message recipient can require that it remain anonymous. For example, if an entity has set all of its attribute information to non-public, it may receive broadcast messages to entities having its attributes, but the message delivery service will not provide an identifying delivery receipt to the message sender. However, the message sender may be informed that a delivery occurred, and possibly the number of messages that were delivered.

Message non-repudiability is provided when the sender requests that the message delivery service guarantee that the sender of the message is correctly identified. Non-repudiability is particularly useful for messages having financial consequences.

Message Handling Agents

When the recipient of a message is a handle, additional flexibility is contemplated. Specifically, the handle may subscribe to the services of a message handling agent (a type of software agent) which performs functions on behalf of the entity represented by the handle in accordance with attributes associated with the handle.

As used herein and in the claims, "software agent" refers to a software program usually executed by one of the host computers shown in FIG. 1. The software agent is a type of vendor service to which an entity may subscribe through its handle. The software agent has various capabilities, depending on its specific implementation, and is characterized by independent operation or agency operation. The software agent is event-driven. The software agent responds to events and carries out behavior in accordance with the event and environment, such as time of day. A software agent is capable of creating, transferring and deleting objects, invoking other vendor services, notifying, monitoring and keeping statistics.

Independent operation indicates that the software agent performs its functions generally independently of how and when its subscribing entity interacts with its network presence.

Agency operation indicates that the software agent operates on behalf of its subscribing entity, typically inheriting access authority and so on of the subscribing entity, in accordance with entity specified preferences usually recorded as attributes for the entity.

Examples of services provided by a message handling agent include notification of a new message, automatic forwarding of messages to endpoints (e.g., a copy to other handles or a message store), summarizing messages, sorting messages according to entity criteria (ex: priority, size, sender and/or subject), deleting messages according to entity criteria, storing messages according to entity criteria, converting the media format of a message, and preparing simple replies to certain formatted messages. That is, message handling agents exhibit context dependent behavior based on the sending and receiving equipment, the message's characteristics and the recipient's preferences.

In one case, a handle may have a "preferred message media format=text" associated therewith. The entity may then communicate a request such as "speak the contents of the most recent message to me" to its message handling agent. In this case, the message handling agent converts the media format of the message from text to voice, and forwards the voice message to a destination indicated by the entity, such as a telephone.

The message handling agent facilitates message enabled behavior. For example, the message handling agent may check the content of a message for a certain type of information, such as schedule related information, and automatically transfer such information to another service associated with the handle, such as a calendar program.

Message Storage Services

Prior art message storage services typically have a physical association between a mailbox, that is, a physical data file, and a message. A message storage service according to the present disclosure is not so limited. A mailbox is considered to be a set of messages which satisfy a query. By varying the attributes specified in the query, an entity can achieve various levels of mailbox granularity, from considering all the messages for which the entity has read permission (which may include messages received by other entities) to considering only a subset of the messages received by one entity such as itself. Additionally, a mailbox may have different message dispositions, such as who is notified of the mailbox query results.

A mailbox is defined by a query over a set of messages. An address book is defined by a query over a set of cyberpresences.

Typical prior art systems treat notifying a recipient of the arrival of a message as a procedural, event-driven process. For example, "do (x) when (y)" where "y" is the event of a message arrival.

The present disclosure contemplates a persistent query, that is, a query for which an entity maintains a continuing interest. The persistent query is a declarative representation depending on at least one property of an object, and is not event-driven. The query originator can assert the query at regular intervals (polling). For example, "if a message has status NEW or UNREAD then it is of interest".

The persistent query defining a set of objects is always consistent with the data against which it is asserted. The persistent query communicates data changes to objects interested in such changes. The persistent query can be implemented, for example, by having the target of the query notify the originator of the query when the response of the target changes.

A persistent query is useful when an entity has a need to know something. A software agent is useful for responding to events in a predetermined manner.

Notifying a recipient of the arrival of a message is a declarative process, that is, an entity is considered as submitting a persistent query, and when the present result of the persistent query invalidates or logically mismatches the previous result of the persistent query, the entity which submitted the query is notified. For example, if the entity has submitted a persistent query for "all stored unread messages addressed to my handle", and a new message has been stored since the last query was asserted, then the result of the previous query (no unread messages) is invalidated, so the a notification message (one unread message) is generated.

Message processing abilities are dependent upon the handle of the entity. For example, as a default, the handle for an entity has full read, write and modify ability for messages addressed to the handle. For particular types of messages addressed to an entity's handle, the entity may specify read, write and/or modify ability for other handles.

A mailbox according to the present disclosure can be considered a one time object when it is the result of a one time query, or can be considered a persistent object when it is the result of a persistent query. A mailbox which is the result of a persistent query is effectively continuously updated. It will be appreciated that an entity can create multiple persistent mailboxes by communicating multiple persistent queries to the message storage service. Such an abstraction is stored as a convenience to an entity.

For example, when the entity is a paging system, the set of persistent queries might be "new messages for each of the users associated with the paging system entity".

The message storage service generates a message ID for each message and provides indexing services for message retrieval so that queries can be satisfied faster. For example, the message storage service may compute message properties such as usage statistics, creation time, message type, message size, current storage medium and so on. Practically and where possible, the message storage service simply extracts certain information from the message envelope as message properties (e.g., sender). If the message object is modified, such as by annotation, or deleted, the message storage service detects this or is notified by the modifier and updates the storage related properties.

The message storage service determines the storage policy for a message according to a general policy (not message specific) specified by a message recipient, including the current storage medium (one of the message properties), and the message persistence, that is, when the message should be moved to archival storage. Finally, the message storage service actually stores the message.

In some embodiments, the message storage service responds to requests for message IDs for messages whose storage is not directly controlled by the service. Such messages, also referred to as "proxy objects", have message IDs and computed properties, and can be queried and retrieved through an interface with the direct controller of the storage of the proxy object. The software which directly controls storage of a proxy object is responsible for notifying the message storage service of message creation, modification and deletion events.

An example of usage of a proxy object is a message shared by several entities. The properties of the proxy object may differ by entity, such as whether the message has been read, or annotations appended thereto. The proxy object may be automatically assigned different priorities for different entities.

Message Storage Agents

When the user of the message store is a handle, additional flexibility is contemplated. Specifically, the handle may subscribe to the services of a message storage agent (a type of software agent) which performs functions on behalf of the entity represented by the handle in accordance with attributes associated with the handle.

Examples of services provided by a message storage agent include notifying an entity of a new message, deleting messages according to message specific entity criteria, archiving messages according to message specific entity criteria, and converting the media format of a message. The summary may include category, thread (relationship to other messages such as topic), content type, content and so on. Activities particularly suited to a message storage agent include archiving messages, aging messages, compressing message and placing messages in different virtual folders.

A message storage agent can assert a persistent query against a message store on behalf of an entity. This function is particularly useful when the entity is a paging system which otherwise expects to be in "receive only" type operation.

For example, a message storage agent might monitor a directory and provide notification of changes in the employer for a particular entity.

As another example, if a vendor service is providing a physical location, such as from a global positioning service, then the message storage agent could notify an entity of the location of another entity, such as a child of the first entity.

Figure 2:
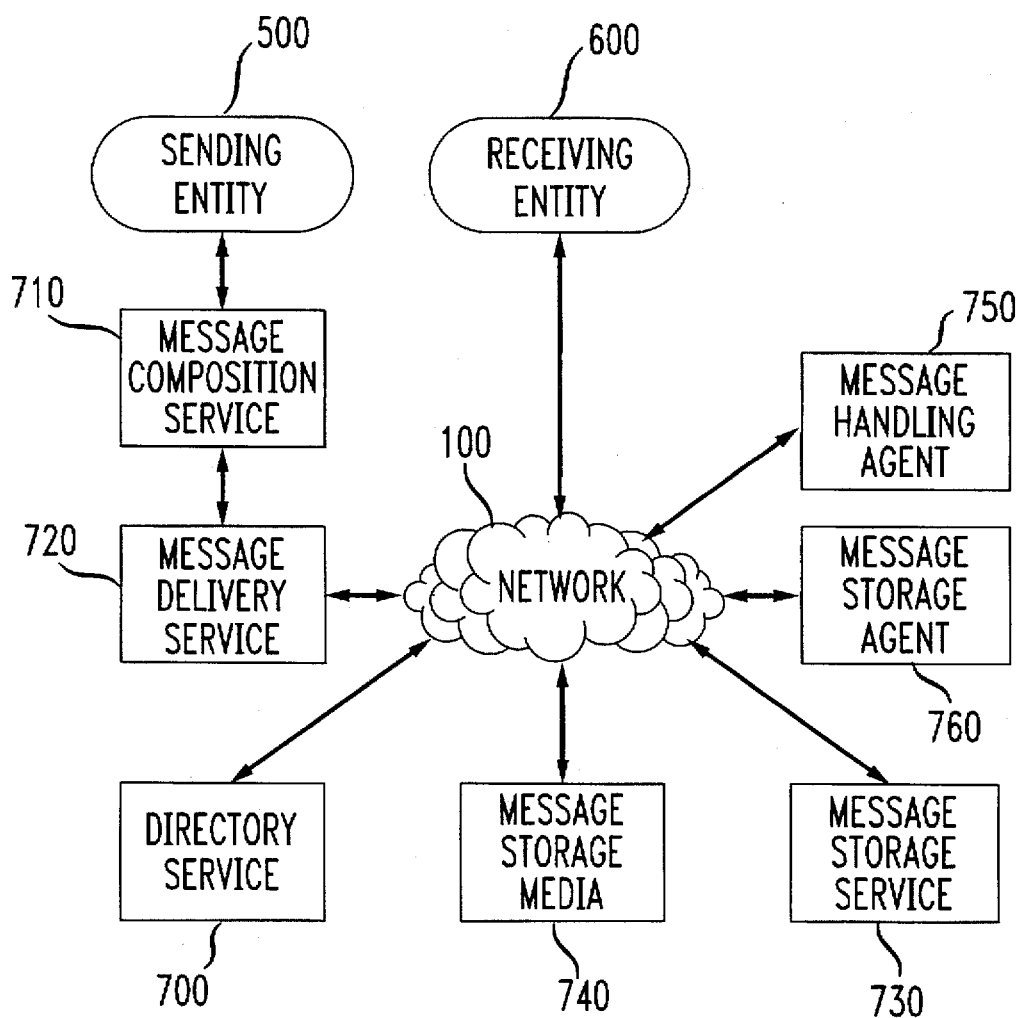
FIG. 2 is a block diagram showing the logical relationship of various services according to the present invention.

FIG. 2 shows the logical relationship of the above-described services. The network directory service 700, message composition service 710, message delivery service 720, message storage service 730, message handling agent 750 and message storage agent 760 each comprise software programs for execution by at least one of the host computers 200, 210, 220 shown in FIG. 1. The message storage media 740 shown in FIG. 2 comprises storage media, such as RAM or disk, associated with at least one of the host computers shown in FIG. 1.

A sending entity 500 communicates with the message composition service 710 to compose a message. Message composition may include interaction with the directory service 700. The sending entity 500 then instructs the message composition service 710 to transfer the composed message to the message delivery service 720, which delivers the message to its specified destination and provides various forms of reports on delivered messages to the sending entity 500.

Messages may be delivered in real time to a receiving entity 600, or may be delivered to the message storage service 730 logically associated with the message storage media 740. The message handling agent 750 generally operates on messages received from the message delivery service 720. The message storage agent 760 generally operates on messages placed on the message storage media 740 by the message storage service 730. The message handling agent 750 and message storage agent 760 operate on behalf of the receiving entity 600.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A message delivery system for use with a communication network and means for providing a network presence for an entity, said message delivery system comprising:

delivery means for delivering a message from a sender to a handle identifying said network presence, said handle not corresponding to a physical endpoint, and means for omitting identifying information for said sender from said message.

2. A message delivery system for use with a communication network and means for providing a network presence for an entity, said message delivery system comprising:

delivery means for delivering a message from a sender to a handle identifying said network presence, said handle not corresponding to a physical endpoint, and means for appending non-repudiable sender information to said message.

3. A message delivery system for use with a communication network and means for providing a network presence for an entity having attributes, said message delivery system comprising:

delivery means for delivering a message from a sender to a handle identifying said network presence, said handle not corresponding to a physical endpoint, means for accepting selected attributes from said sender as an address, and means for replacing the selected attributes with an address of said network presence without disclosing the address to said sender.

4. A message delivery system for use with a communication network and means for providing a network presence for an entity having attributes, said attributes including a processing preference for messages delivered to said network presence, said message delivery system comprising:

delivery means for delivering a message from a sender to a handle identifying said network presence, said handle not corresponding to a physical endpoint, and a software agent for processing the delivered message in accordance with said processing preference.

5. The system of claim 4, wherein said processing preference is a preferred media format, and said software agent is operative to convert a media format of the delivered message to the preferred media format.

6. The system of claim 4, wherein said processing preference specifies one of a notifying action, a forwarding action, a deleting action and a storing action, and said software agent is operative to perform the action specified by said processing preference when said message is delivered to said network presence.

* * * * *